United States Patent [19]

Vunsh et al.

[11] Patent Number: 5,039,536

[45] Date of Patent: Aug. 13, 1991

[54] PRODUCTION AND USE OF A HIGH-INTENSITY RED NATURAL COLORANT DERIVED FROM CARROT CELL TISSUE CULTURES

[75] Inventors: Ron Vunsh, Hamerkaz; Michael B. Matilsky, Mevasseret Zion, both of Israel

[73] Assignee: International Genetic Sciences Partnership, Research Triangle Park, N.C.

[21] Appl. No.: 546,935

[22] Filed: Jul. 2, 1990

Related U.S. Application Data

[62] Division of Ser. No. 737,432, May 24, 1985, Pat. No. 4,939,086.

[51] Int. Cl.$^5$ ............................................. A23L 1/275
[52] U.S. Cl. ..................... 426/250; 426/540; 426/49; 435/41; 435/67; 435/74; 8/438; 8/506; 8/646; 8/637.1
[58] Field of Search ............. 426/49, 250, 540; 435/41, 67, 74; 8/438, 506, 646, 53, 80

[56] References Cited

U.S. PATENT DOCUMENTS

| | | | |
|---|---|---|---|
| 4,115,595 | 9/1978 | Jordan | 426/250 |
| 4,118,516 | 10/1978 | Praag et al. | 426/250 |
| 4,145,254 | 3/1979 | Shephard et al. | 426/250 |
| 4,172,902 | 10/1979 | Asen et al. | 426/250 |
| 4,238,518 | 12/1980 | Poisson | 426/250 |
| 4,304,792 | 12/1981 | Sreenivasan et al. | 426/250 |
| 4,452,822 | 6/1984 | Shrikhande | 426/250 |
| 4,481,226 | 11/1984 | Crosby | 426/250 |
| 4,500,556 | 2/1985 | Langsbon | 426/250 |

OTHER PUBLICATIONS

Handbook of U.S. Colorants for Foods, Drugs & Cosmetics, Wiley–Interscience Pub. John Wiley & Sons, N.Y. pp. 109, 1984.

*Primary Examiner*—Jeanette Hunter
*Attorney, Agent, or Firm*—Breiner & Breiner

[57] ABSTRACT

The production and use of a high-intensity red natural colorant prepared from an anthocyanin derived from the cell line of *Daucus carota* (carrot) is described. The production of the high-intensity red natural colorant comprises the cultivation of *Daucus carota* in a cell tissue culture. Carrot cells are extracted from the cell tissue culture after subculturing and a suitable growth period. The extract is then purified in order to isolate the anthocyanin found in the carrot cells. The anthocyanin is then concentrated to produce the red natural colorant of the invention. The natural colorant produced is stable over a wide pH range under various conditions. The natural colorant is useful as a coloring agent for food products, cosmetics, and pharmaceuticals.

3 Claims, 2 Drawing Sheets

PRODUCTION AND USE OF A HIGH-INTENSITY RED NATURAL COLORANT DERIVED FROM CARROT CELL TISSUE CULTURES

This is a division of application Ser. No. 06/737,432 filed May 24, 1985 now U.S. Pat. No. 4,939,086.

FIELD OF INVENTION

This invention relates to the production and use of a high-intensity red natural colorant prepared from a naturally occurring anthocyanin synthesized by cells in culture of a cell line of *Daucus carota* (carrot). The high-intensity red natural colorant is useful as a coloring agent in food products, cosmetics and pharmaceuticals and is stable over a wide pH range under various conditions.

BACKGROUND OF INVENTION

Anthocyanins are an important and widespread group of coloring agents found in nature. Anthocyanins are watersoluble color pigments found primarily in higher plant flowers, fruits and vegetables. The anthocyanin used to produce the natural colorant of the present invention is derived from the cell line *Daucus carota*. The cell line of *Daucus carota* produces an excess of a single anthocyanin which is a secondary metabolite. The anthocyanin derived from the cell line of *Daucus carota* is an intensely colored, water-soluble pigment whose coloration varies from dark reds to purples and blues depending on pH level.

U.S. Pat. No. 4,172,902 discloses that it is known that most naturally occurring anthocyanins are intensely colored at pH levels below 3 but that anthocyanins are virtually colorless in an environment having pH values above 3. This patent also discloses the anthocyanin, peonidin 3-(dicaffeylsophoroside)-5-glucoside derived from "Heavenly Blue" Morning Glory, which according to the patent is useful for producing stable colors in food and beverages at pH values from about 2.0 to about 8.0.

Additionally, it is generally known that *Daucus carota* cells can be grown in cell suspension cultures in a defined liquid media as well as in callus cultures grown on plates containing the same defined liquid media as used in the suspension cultures with the addition of 1.0% agar. Generally, however, isolation of natural colors from plant flowers, fruits or vegetables requires the use of the whole plant rather than cells grown in a tissue culture. As a result of using a whole plant, the growth of the plant is slower, less manipulatable and is restricted due to natural geographic limitations, such as climate, soil, water, pests, seasonal growth, transportation, etc.

A naturally produced coloring agent is of considerable importance and commercial interest due to the present need to replace the currently used artificial coal tar (azo type) dyes as additives in food products. The artificial coal tar dyes are presently believed to be carcinogenic agents. Anthocyanins have several advantages as a naturally produced coloring agent in that anthocyanins have been present in human and animal food chains for generations without apparent adverse effects on health. Further, anthocyanins produce brightly colored red hues and are water-soluble. However, anthocyanins generally are not stable over a wide pH range which is necessary in order for a natural colorant to be useful as a coloring agent in food products.

OBJECTS OF THE INVENTION

It is an object of this invention to produce a highintensity red natural colorant prepared from an anthocyanin derived from the cell line of *Daucus carota* (carrot).

It is a further object of this invention to produce a red natural colorant which is stable over a wide pH range of from about 2.0 to 7.0 under various conditions.

It is a further object of this invention to utilize a modified cell tissue culture media to optimally produce large amounts of anthocyanin from the cell line of *Daucus carota*.

It is a further object of this invention to provide a naturally produced coloring agent which is useful as a coloring agent for food products, cosmetics and pharmaceuticals.

BRIEF DESCRIPTION OF INVENTION

The above objects are realized by the present invention which also has the additional advantages, due to the cultivation of the carrot cells in a cell tissue culture, of allowing the *Daucus carota* cells to be more quickly and easily manipulated so as to increase the yield of the desired compound and avoid natural geographic restrictions, such as climate, soil, water, pests, seasonal growth, transportation, etc. The first step in the production of a high-intensity red the cultivation of the cell line of *Daucus carota* (carrot) which produces a water-soluble anthocyanin. The cultivation of *Daucus carota* takes place in a cell tissue culture which may be either a callus culture or a cell suspension culture. The preferred media used in the cell tissue culture is a modified Gambourg B5 media. Subsequent to the initial cultivation of the carrot cells, the carrot cells are subcultured periodically with an inoculum into fresh media. The cells are harvested after subculture by filtering out the media and then either freshly extracting the cells or extracting the cells after freezing the cells. Purification of the cell extract is then carried out in order to isolate the anthocyanin. The anthocyanin concentrate is preferably freeze dried to a powder. The *Daucus carota* cell extract is intensely colored red to purple and blue at acidic pH levels up to 7.0. The colorant produced by this invention is stable at pH levels ranging from 2.0 to 7.0 under various conditions.

DETAILED DESCRIPTION AND PRESENTLY PREFERRED EMBODIMENT OF INVENTION

Figure 1:
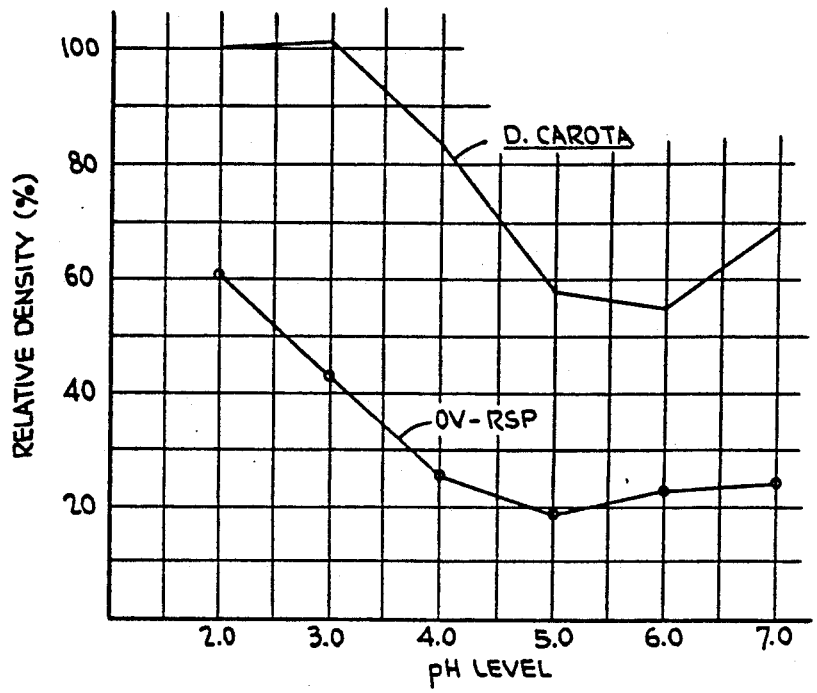
FIG. 1 illustrates the relative intensity of color of the *Daucus carota* anthocyanin preparation compared to the relative intensity of color of Overseal Foods, Ltd.'s Natural Red Standard Powder (OV-RSP) at pH levels ranging from 2.0 to 7.0 on Day 0, using the optical density of the *Daucus carota* anthocyanin at pH 2.0 as 100%.

*Daucus carota* is known to be grown in cell suspension cultures in defined liquid media as well as in callus cultures grown on plates containing the same defined liquid media with 1% agar. Standard cell tissue culture media may be utilized to cultivate the cell line of *Daucus carota*, such as the Gambourg B5 media. The Gambourg B5 media contains the following elements per liter:

| Element | Amount |
| --- | --- |
| $(NH_4)_2SO_4$ | 134 mg |
| $NaH_2PO_4.H_2O$ | 150 mg |
| $KNO_3$ | 2.5 gm |
| $MgSO_4.3H_2O$ | 250 mg |
| $CaCl_2.2H_2O$ | 150 mg |
| $MnSO_4.H_2O$ | 10 mg |
| $H_3BO_3$ | 3 mg |
| $ZnSO_4.7H_2O$ | 2 mg |
| $Na_2MoO_4.2H_2O$ | $2.5 \times 10^{-1}$ mg |
| $CaSO_4.5H_2O$ | $2.5 \times 10^{-2}$ mg |
| $CoCl_2.6H_2O$ | $2.5 \times 10^{-2}$ mg |
| KI | $7.5 \times 10^{-1}$ mg |
| mesoinositol | 100 mg |
| nicotinic acid | 1 mg |
| thiamine | 10 mg |
| pyridoxine | 1 mg |
| sucrose | 20 gm |
| NaFe EDTA | 30 mg |
| 2,4-dichlorophenoxy-acetic acid | 1 mg | the preferred media to use in the present invention is a modified Gambourg B5 media which allows the optimal production of large amounts of anthocyanin. The modification of Gambourg's B5 media involved changes in the amount of hormone, phosphate, the type of sugar used as a carbon source and the addition of an anti-precipitant. The modified Gambourg B5 media used in the cell tissue culture in the present invention contain the following elements per liter:

| Element | Amount |
| --- | --- |
| $(NH_4)_2SO_4$ | 134 mg |
| $NaH_2PO_4.H_2O$ | 75 mg |
| $KNO_3$ | 2.5 gm |
| $MgSO_4.3H_2O$ | 250 mg |
| $CaCl_2.2H_2O$ | 150 mg |
| $MnSO_4.H_2O$ | 10 mg |
| $H_3BO_3$ | 3 mg |
| $ZnSO_4.7H_2O$ | 2 mg |
| $Na_2MoO_4.2H_2O$ | $2.5 \times 10^{-1}$ mg |
| $CaSO_4.5H_2O$ | $2.5 \times 10^{-2}$ mg |
| $CoCl_2.6H_2O$ | $2.5 \times 10^{-2}$ mg |
| KI | $7.5 \times 10^{-1}$ mg |
| mesoinositol | 100 mg |
| nicotinic acid | 1 mg |
| thiamine | 10 mg |
| pyridoxine | 1 mg |
| Galactose | 20 gm |
| NaFe EDTA | 30 mg |
| 2,4-dichlorophenoxy-acetic acid | 0.1 mg |
| Nitrilotriacetic acid | 15 mg |

The first step in the present preferred embodiment of the production of a high-intensity red natural colorant is the placing of carrot cells in a cell tissue culture having a modified Gambourg B5 media as described above and then allowing the carrot cells to grow. For the purpose of the present discussion, the production of the natural colorant will be described in terms of the carrot cells being cultivated in a cell suspension culture. It is noted that a callus culture may also be utilized.

The carrot cells in suspension are then subcultured on a bi-weekly basis with a 10% inoculum into a fresh media. The flask containing the cell culture is kept at 25° to 29° C. in a 16:8 hour light:dark cycle on a rotary shaker at 100 rpm, i.e., the cell suspension culture is exposed to light for 16 hours followed by being in darkness for 8 hours.

The culture cells are harvested 12 to 14 days after subculture by filtering out the media and then either (1) freshly extracting the cells with acidic methanol or acidic ethanol (0.1% HCl); (2) extracting the cells with acidic methanol or acidic ethanol (0.1% HCl) after freezing the cells, or (3) extracting the cells with hot water after freezing the cells.

The first stage in the purification of the cells and the isolation of the anthocyanin in the carrot cells is the concentration of the extract to dryness on a rotary evaporator followed by the resolubilization of the extract in double distilled water. Thereafter, the crude concentrated extract is treated with a small amount of an ion-exchange resin, such as Whatman's DE-52 ion-exchange resin, to remove strongly binding compounds. The material is centrifuged at 210×g to pelletize the resin. The supernatant is neutralized to pH 7.30 and applied to a column of DE-52 ion-exchange resin that has been equilibrated with 15mM sodium acetate having a pH of 7.30. The column is eluted, first with 15mM sodium acetate having a pH of 7.30 to remove loosely bound contaminants and then with 1% acetic acid to release the more strongly bound anthocyanin. Samples from the anthocyanin-containing fractions are diluted with 1% acetic acid and scanned in a UV-VIS spectrophotometer, such as the Bausch & Lomb Spectronic 2000, of anthocyanin. The fractions are then pooled and lyophilized to yield a non-hygroscopic powder which represents 2–3% of the cell dry weight and results in 20 to 25 optical density/milligram when dissolved in 1% acetic acid. A red natural colorant is obtained when the concentrate is freeze dried to a powder.

To show the high intensity of the produced red natural colorant, the color intensity or optical density (OD) and the λ (lambda) maximum wavelength were determined for the anthocyaninic red colorant for the pH levels 2.0 to 7.0 and compared with the optical density and the λ (lambda) maximum wavelength at pH levels 2.0 to 7.0 of a commercially available anthocyanin preparation, i.e., Overseal Foods Ltd.'s Natural Red Standard Powder (OV-RSP), manufactured by Overseal Foods Ltd., located in England. Solutions using the anthocyaninic red colorant derived from *Daucus carota* according to this invention and Overseal Foods Ltd.'s Natural Red Standard Powder were prepared in a sterile 0.1M citrate buffer. The two prepared solutions were then divided into samples whose pH was adjusted by the addition of hydrogen chloride or sodium hydroxide so that a sample was obtained for each pH level from 2.0 to 7.0. Thereafter, the solutions were diluted so that the concentration of each solution was 1.0 gram per liter. The λ (lambda) maximum wavelength in nanometers (nm) and the optical density were measured in a Bausch & Lomb Spectronic 2000 spectrophotometer. The results of the comparison are listed in Table 1 and are shown graphically in FIG. 1.

TABLE 1

| | Daucus carota | | | OV-RSP | | |
|---|---|---|---|---|---|---|
| pH | max (nm) | OD | relative intensity (%) | max (nm) | OD | relative intensity (%) |
| 2.0 | 525.1 | 1.135 | 100.0 | 522.9 | 0.693 | 61.1 |
| 3.0 | 525.7 | 1.146 | 101.0 | 523.9 | 0.493 | 43.4 |
| 4.0 | 528.1 | 0.956 | 84.0 | 530.3 | 0.289 | 25.5 |
| 5.0 | 537.7 | 0.659 | 58.0 | 535.5 | 0.213 | 18.8 |
| 6.0 | 545.9 | 0.620 | 55.0 | 560.3 | 0.261 | 23.0 |
| 7.0 | 584.1 | 0.785 | 69.0 | 571.1 | 0.274 | 24.1 |

The results of the comparison testing between the *Daucus carota* anthocyanin preparation and OV-RSP preparation show that the *Daucus carota* anthocyanin preparation possesses a color intensity, i.e., optical density, 1.6 to 3.3 times as strong as that of OV-RSP at all pH levels tested. Further, as illustrated in FIG. 1, the relative intensity of color of the *Daucus carota* preparation is consistently higher than the relative intensity of color of the OV-RSP preparation.

The stability of the anthocyanin of *Daucus carota* and OV-RSP was also tested and compared for pH levels 2.0-5.0 under various treatments, including freezing, refrigeration, at room temperature exposed to light, at room temperature in darkness, heating the preparation to 90° C. for five minutes followed by room temperature and light, and autoclaving at 120° C. and 1.4 atmospheres for 10 minutes followed by room temperature and light. The pH levels from 6.0-7.0 were eliminated from these tests since neither product is stable at these pH levels unless kept frozen.

Figure 2:
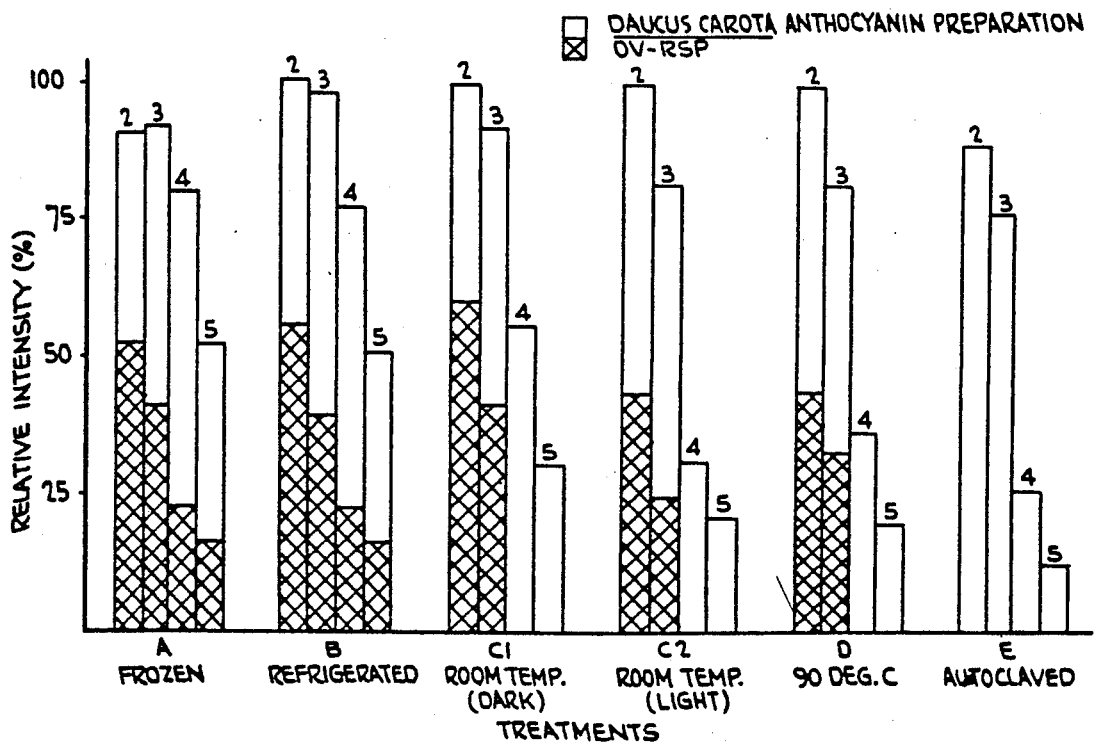
FIG. 2 illustrates the percentage of retention of Day 0 optical density after one month for pH levels 2.0 to 5.0 of the *Daucus carota* anthocyanin preparation as compared to the OV-RSP red color under various treatments, including freezing, refrigeration, room temperature in darkness, room temperature in light, heating to 90° C. for five minutes followed by room temperature and light, and autoclaving at 120° C. and 1.4 atmospheres for 20 minutes followed by room temperature and light. It is noted that 100% intensity is the otical density (OD) of untreated *Daucu carota* anthocyanin (i.e., 1:135 OD/mg).

The samples of the anthocyaninic colorant derived from *Daucus carota* and OV-RSP were removed from the abovedescribed treatments after one month for measurement of the λ (lambda) maximum wavelength and optical density. The results after one month for the samples under the various conditions stated above are graphically presented in FIG. 2 for the anthocyaninic colorant derived from *Daucus carota* and for the OV-RSP colorant. The *Daucus carota* product retained more of its original color intensity than OV-RSP did at any of the pH levels tested. The test results as illustrated in FIG. 2 show that the *Daucus carota* product retains 75-100% of its original color intensity at pH levels 2.0-3.0 under all treatments. The *Daucus carota* product at pH levels 4.0-5.0 retained 15-80% of its original color intensity depending on the treatment. The OV-RSP, in comparison, at pH levels of 2.0-3.0 retained 0-60% of its original color intensity after one month depending on the treatment undergone by the sample. At pH levels 4.0-5.0, OV-RSP lost all of its color after one month under conditions of room temperature exposed to light or in darkness, at 90° C. and after autoclaving.

In order to further show the stability of the cultured anthocyaninic colorant derived from *Daucus carota*, tests were performed for a three-month period and a six-month period using the anthocyaninic red natural colorant under various conditions, including freezing, refrigeration, at room temperature exposed to light and in darkness, heating to 90° C. for five minutes followed by room temperature and exposure to light, and autoclaving at 120° C. and 1.4 atmosphere for 20 minutes followed by room temperature and exposure to light.

Figure 3:
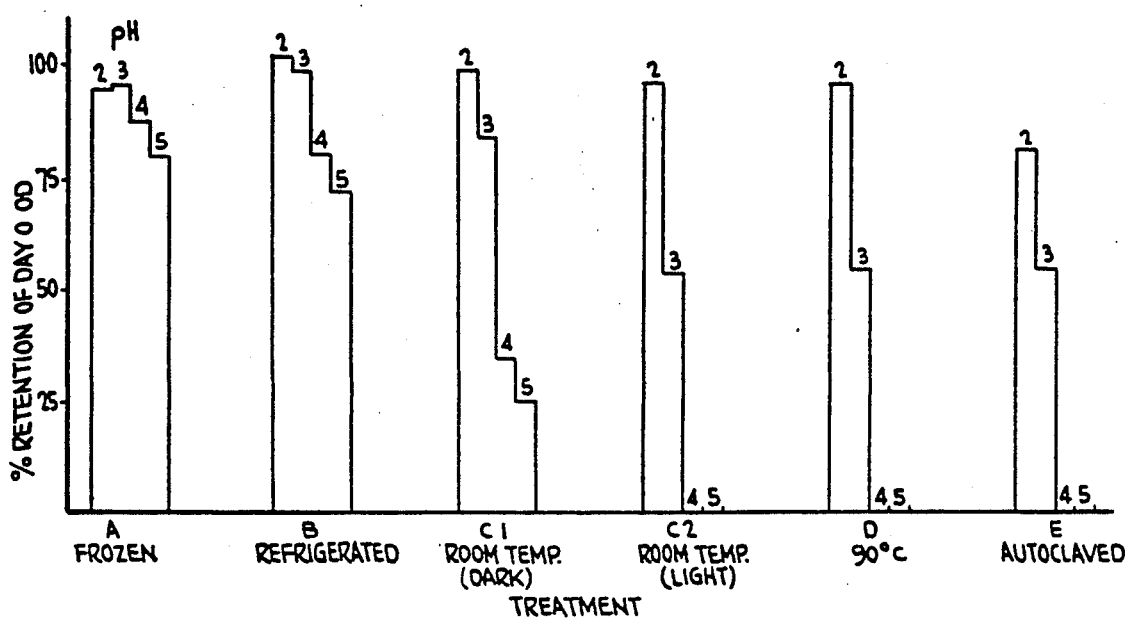
FIG. 3 illustrates the percentage of retention of Day 0 optical density after three months for pH levels 2.0 to 5.0 of the *Daucus carota* anthocyanin preparation under various treatments, including freezing, refrigeration, room temperature in darkness, room temperature in light, heating to 90° C. for five minutes followed by room temperature and light, and autoclaving at 120° C. and 1.4 atmospheres for 20 minutes followed by room temperature and light.

The results of testing of the *Daucus carota* product after the three-month period is graphically illustrated in FIG. 3. After three months of storage in the freezer, refrigerator or at room temperature in darkness, the *Daucus carota* product retained greater than 80% of its original color intensity at a pH level of 2.0-3.0. At pH levels of 4.0-5.0, freezing and refrigeration were capable of protecting greater than 75% of the color. Storage at room temperature in darkness resulted in some further loss of color, as compared to the one-month period, at pH levels of 4.0-5.0. Storage at room temperature under exposure to light resulted in a complete loss of color at pH levels 4.0-5.0.

Figure 4:
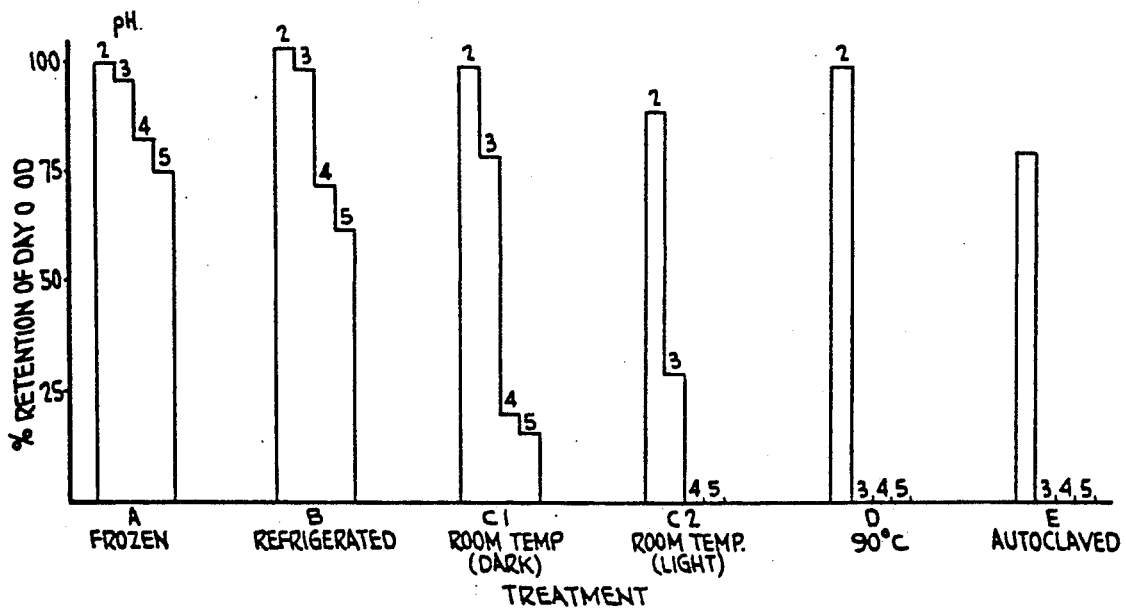
FIG. 4 illustrates the percentage of retention of Day 0 optical density after six months for pH levels 2.0 to 5.0 of the *Daucus carota* anthocyanin preparation under various treatments, including freezing, refrigeration, room temperature in darkness, room temperature in light, heating to 90° C. for five minutes followed by room temperature and light, and autoclaving at 120° C. and 1.4 atmospheres for 20 minutes followed by room temperature and light.

The results of testing after the six-month period for the *Daucus carota* product is graphically illustrated in FIG. 4. After six months in storage in the freezer, refrigerator or at room temperature in darkness, the results were approximately the same as after three months. The only distinguishable difference after the six-month period as compared to after the three-month period was at pH level 3.0 under conditions of heating to 90° C. followed by room temperature and light and after autoclaving. Under these conditions at pH level 3.0, the *Daucus carota* product after six months had a complete loss of color, while after three months the *Daucus carota* product retained greater than 50% of its color.

The *Daucus carota* cell line produces approximately 300 mg of anthocyanin per liter of cell suspension culture in 10 to 12 days, representing 2-3% of the cell dry weight. The cell extract is intensely colored red to purple and blue at acidic pH levels up to 7.0.

As will be apparent to one skilled in the art, various modifications can be made within the scope of the aforesaid description. Such modifications being within the ability of one skilled in the art form a part of the present invention and are embraced by the appended claims.

It is claimed:

1. A colored composition comprising a food product and a colorant in an amount effective to give said food product an anthocyanin color, said colorant being derived from the cell line of *Daucus carota* by cultivating said *Daucus carota* cells in a cell tissue culture, harvesting the culture cells, and isolating anthocyanin from said harvested cultured cells to provide a water-soluble anthocyaninic colorant.

2. A colored composition comprising a cosmetic product and a colorant in an amount effective to give said cosmetic product an anthocyanin color, said colorant being derived from the cell line of *Daucus carota* by cultivating said *Daucus carota* cells in a cell tissue culture, harvesting the culture cells, and isolating anthocyanin from said harvested cultured cells to provide a water-soluble anthocyaninic colorant.

3. A colored composition comprising a pharmaceutical product and a colorant in an amount effective to give said pharmaceutical product an anthocyanin color, said colorant being derived from the cell line of *Daucus carota* by cultivating said *Daucus carota* cells in a cell tissue culture, harvesting the cultured cells, and isolating anthocyanin from said harvested cultured cells to provide a water-soluble anthocyaninic colorant.

* * * * *